United States Patent
Bates et al.

(10) Patent No.: US 7,913,117 B2
(45) Date of Patent: Mar. 22, 2011

(54) PROVIDING REMOVABLE STORAGE MANAGEMENT SERVICES USING REMOVABLE STORAGE ERROR INFORMATION

(75) Inventors: Allen Keith Bates, Tucson, AZ (US); Eric Rolf Christensen, Tucson, AZ (US); Shinobu Wada, Tokyo (JP); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 11/837,473

(22) Filed: Aug. 10, 2007

(65) Prior Publication Data

US 2009/0040650 A1 Feb. 12, 2009

(51) Int. Cl.
*G06F 11/00* (2006.01)
(52) U.S. Cl. .......................................... 714/27; 714/42
(58) Field of Classification Search ................ 714/27, 714/42
See application file for complete search history.

(56) References Cited

U.S. PATENT DOCUMENTS

| | | | |
|---|---|---|---|
| 5,596,712 A | 1/1997 | Tsuyama et al. | |
| 6,581,076 B1 | 6/2003 | Ching et al. | |
| 6,658,586 B1 | 12/2003 | Levi | |
| 6,854,074 B2 | 2/2005 | McLellan et al. | |
| 6,892,317 B1 * | 5/2005 | Sampath et al. | 714/4 |
| 7,120,830 B2 | 10/2006 | Tonack | |
| 7,171,585 B2 | 1/2007 | Gail et al. | |
| 2004/0006702 A1 | 1/2004 | Johnson | |
| 2004/0078721 A1 | 4/2004 | Williams et al. | |
| 2005/0188246 A1 | 8/2005 | Emberty et al. | |
| 2006/0126211 A1 | 6/2006 | Sasaki | |
| 2006/0143519 A1 * | 6/2006 | Maier et al. | 714/25 |
| 2007/0294560 A1 | 12/2007 | Muthukumarasamy et al. | |
| 2008/0155360 A1 | 6/2008 | Bates et al. | |

OTHER PUBLICATIONS

US Patent Application entitled Accessing Removable Storage Management Services to Obtain Replacement Instructions Indicating Whether to Replace Removable Storage, Serial No. unknown, filing date Aug. 10, 2007 by inventors A.K. Bates, E.R. Christensen, S. Wada and D.J. Winarski.

G.A. Jaquette, "LTO: A Better Format for Mid-Range Tape", IBM Journal of Research & Development, vol. 47, No. 4, Jul. 2003, pp. 429-444.

* cited by examiner

*Primary Examiner* — Bryce P Bonzo
(74) *Attorney, Agent, or Firm* — David W. Victor; Konrad Raynes & Victor LLP

(57) ABSTRACT

Provided are a method, system, and article of manufacture for providing removable storage management services using removable storage error information. Read/write error information is obtained for at least one removable storage by interfacing with the removable storage manager. The obtained read/write error information for the at least one removable storage is processed to determine read/write error rates for the at least one removable storage. A determination is made as to whether the determined read/write error rates for the at least one removable storage exceed at least one read/write error threshold. At least one message is sent to the removable storage manager to replace the at least one removable storage having read/write error rates that exceed the at least one read/write error threshold.

21 Claims, 5 Drawing Sheets

Removable Storage Information

Removable Storage Management Request

Gathered Error Information

Removable Storage Management Instructions

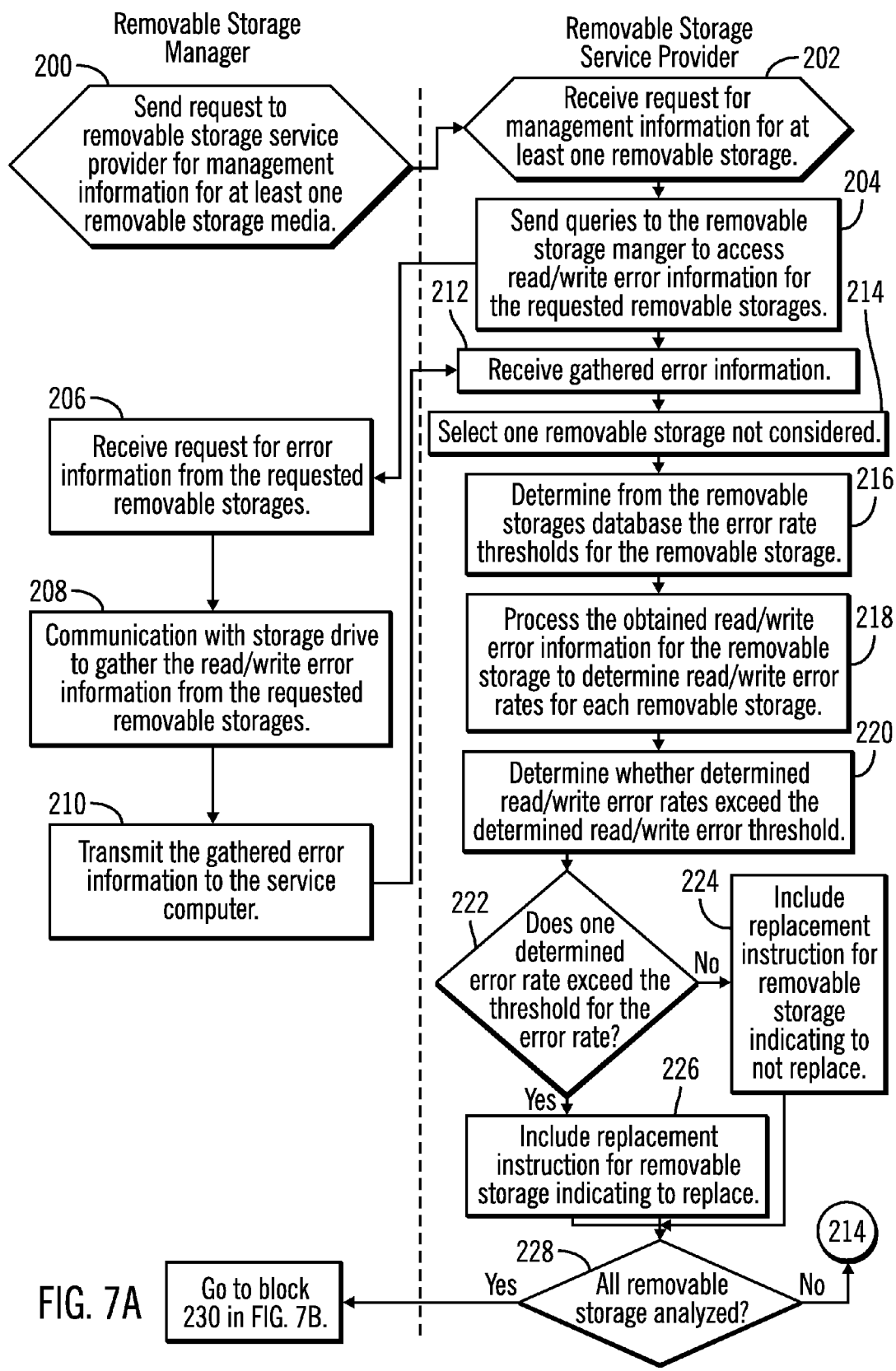

PROVIDING REMOVABLE STORAGE MANAGEMENT SERVICES USING REMOVABLE STORAGE ERROR INFORMATION

BACKGROUND OF THE INVENTION

1. Field of the Invention

The present invention relates to a method, system, and article of manufacture for providing removable storage management services using removable storage error information.

2. Description of the Related Art

Data storage customers often maintain a library of removable storage, such as tape cartridges, to store data. Alternately, these libraries may hold optical disk cartridges or hard-disk cartridges. The customer manages the tape library to replace tapes that fail or have reached their end of life. Preferably, the customer will replace a tape at the end of life before failure to allow for the migration of data from the tape approaching end of life. However, the customer may not be able to determine when tape cartridges are approaching their end of life (EOL). The customer may observe increased time for backup operations before the cartridge fails, resulting in decreased performance. However, the customer cannot be assured that such observed decreased performance results from a failing tape used to access the tape or a marginal tape. Further, vendors have to provide significant customer support to assist customers in the recovery of their data when tape cartridges fail before the cartridge can be replaced before failure.

There is a need in the art for improved techniques for managing the replacement of removable storages.

SUMMARY

Provided are a method, system, and article of manufacture for providing removable storage management services using removable storage error information. Read/write error information is obtained for at least one removable storage by interfacing with the removable storage manager. The obtained read/write error information for the at least one removable storage is processed to determine read/write error rates for the at least one removable storage. A determination is made as to whether the determined read/write error rates for the at least one removable storage exceed at least one read/write error threshold. At least one message is sent to the removable storage manager to replace the at least one removable storage having read/write error rates that exceed the at least one read/write error threshold.

BRIEF DESCRIPTION OF THE DRAWINGS

FIGS. 7a and 7b illustrate an embodiment of operations to service requests to manage removable storage.

DETAILED DESCRIPTION

Figure 1:
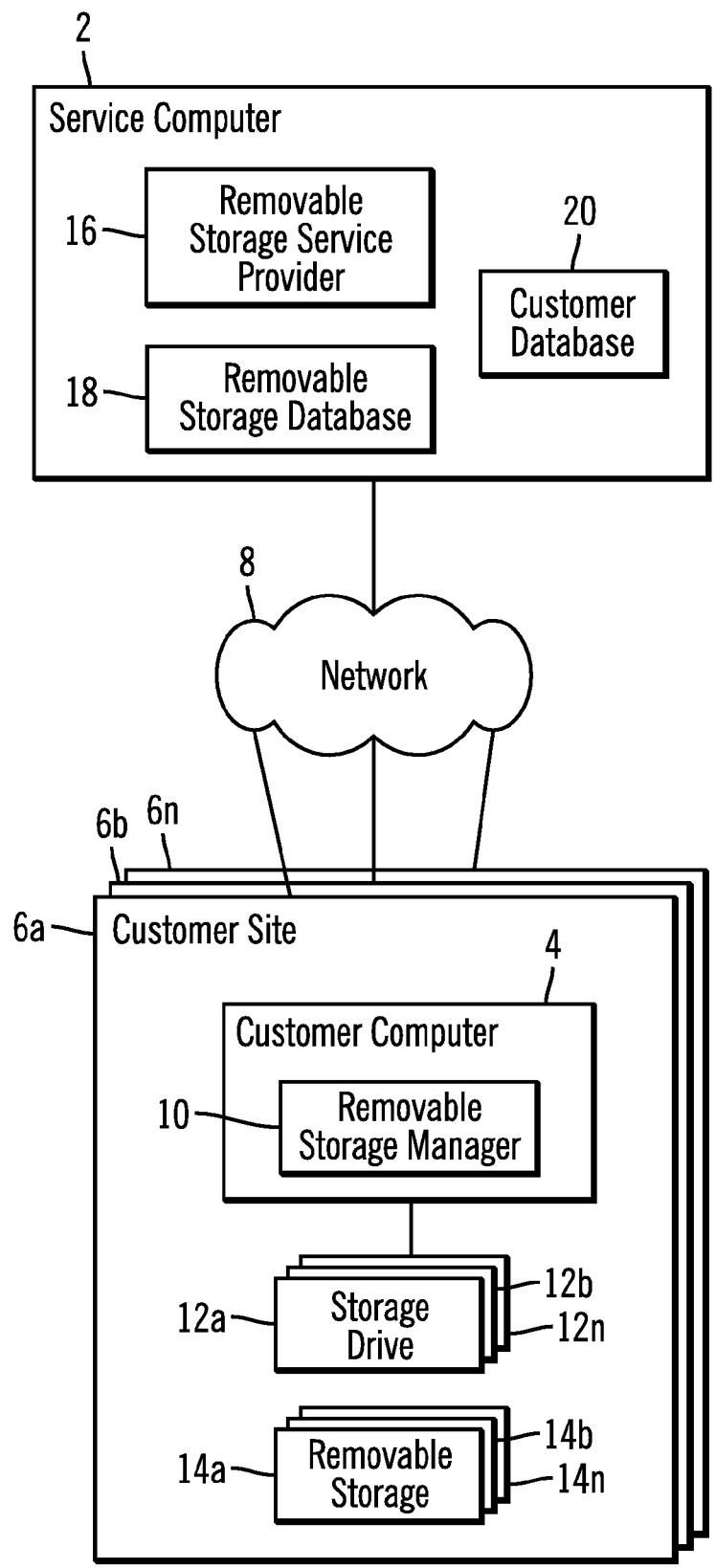
FIG. 1 illustrates an embodiment of a network computing environment.

FIG. 1 illustrates an embodiment of a network computing environment including a service computer 2 that interacts with a customer computer 4 at each customer site 6a, 6b . . . 6n over a network 8. The customer computer 4 includes a removable storage manager 10. Each removable storage manager 10 manages access to one or more storage drives 12a, 12b . . . 12n in which removable storages 14a, 14b . . . 14n may be coupled. The service computer 2 includes a removable storage service provider 16 that interacts with the removable storage manager 10 to obtain read/write error information with respect to removable storage 14a, 14b . . . 14n to manage the removable storage 14a, 14b . . . 14n for the customer.

A removable storage database 18 includes read/write error thresholds for removable storage. In one embodiment, the removable storage database 18 may include error rate thresholds from different vendors, where the service provider provides removable storage management operations for different removable storage vendors. In a further embodiment, the service provider may comprise a removable storage vendor (or agent of the vendor) and the removable storage database 18 may only include error rate information for removable storages distributed by the vendor. For instance, the vendor may maintain the error rate information in a confidential manner, but supply the removable storage management services of the described embodiments to provide customers management information on when to replace removable storage 14a, 14b . . . 14n without having to release the confidential error rate information.

A customer database 20 includes information on customers who are obtaining management information for their removable storage 14a, 14b . . . 14n. The customer database 20 may include information for customers, including the determined error rates for the removable storages 14a, 14b . . . 14n at the customer sites 6a, 6b . . . 6n, billing information for the customer, etc.

The customer computer 4 may comprise a suitable computational device known in the art, such as a tape controller, storage server, desktop computer, workstation, mainframe, held computing devices, telephony devices, etc. The service computer 2 may comprise a suitable server system known in the art. The network 8 may comprise a Wide Area Network (WAN), Local Area Network (LAN), Storage Area Network (SAN), wireless network, the Internet, an Intranet, peer-to-peer network, etc.

The storage drives 12a, 12b . . . 12n may each comprise a device for interfacing with a removable storage 14a, 14b . . . 14n, and may be external to the customer computer 4 or implemented within the customer computer 4 as an expansion card in a slot on the customer computer 4 motherboard or as a chipset mounted on the customer computer 4 motherboard. The storage drives 12a, 12b . . . 12n may comprise the interface unit capable of interfacing with a replaceable storage media, such as a hard disk drive controller (e.g., Redundant Array of Independent Disk (RAID) controller, an Integrated Drive Electronics (IDE) adaptor, Serial Attached SCSI (SAS) adaptor, etc.), tape controller or drive, Universal Serial Bus (USB) interface, interface for a Flash memory or any other storage derive or interface for coupling to the removable storage 14a, 14b . . . 14n. The removable storage 14a, 14b . . . 14n may comprise any type of media on which data may be stored and which may serve as removable media, including but not limited to magnetic media (such as magnetic tape or removable disks), optical media (such as optical tape, Compact Disk ("CD"), Digital Versatile Disk ("DVD"), Ultra Density Optical ("UDO"), High Definition DVD ("HD-DVD"), Blu-Ray, holographic, etc), electronic media (such as PROM, EEPROM, flash PROM, MRAM, CompactFlash™, Smartmedia™, Memory Stick™, etc.), or other suitable media. In certain embodiments, the removable storage comprises a cartridge housing including the storage media, such as the case with a magnetic tape cartridge or removable disk drive. Exemplary magnetic tape cartridges and tape drives are International Business Machine Corporation's ("IBM") Linear Tape Open (LTO) which may be used by mid-range customers, such as System-P and System-I, and IBM's 3592, which may be used by enterprise customers such as System-Z. Both the LTO and 3592 tape cartridges and tape drives may reside in the exemplary IBM 3584 tape library. IBM is a registered trademark of International Business Machines Corp. in the United States and foreign countries.

The removable storage manager 10 may comprise hardware and/or software that interfaces the computer system 4 with the storage drives 12a, 12b . . . 12n and removable storage 14a, 14b . . . 14n, such as a device driver in the customer computer 4 operating system, a library management program that manages operations for numerous storage drives and removable storage media, etc. The removable storage manager 10 may also manage read/write access to the storage drives 12. In embodiments where the removable storages 14a, 14b . . . 14n comprise sequential access magnetic tape media, the removable storage manager 10 may issue commands to load and mount one or more of the removable storage 14a, 14b . . . 14n into corresponding tape drives 12a, 12b . . . 12n, which is accomplished in a library by moving a robotic picker-gripper assembly to transport tape cartridges between their storage-slots and tape drives. Alternatively, the removable storage manager 10 may send alerts to an administrator, e.g., Simple Network Management Protocol (SNMP) alerts, to direct the administrator to remove and load removable storage 14a, 14b . . . 14n in the storage drives 12a, 12b . . . 12n.

Figure 2:
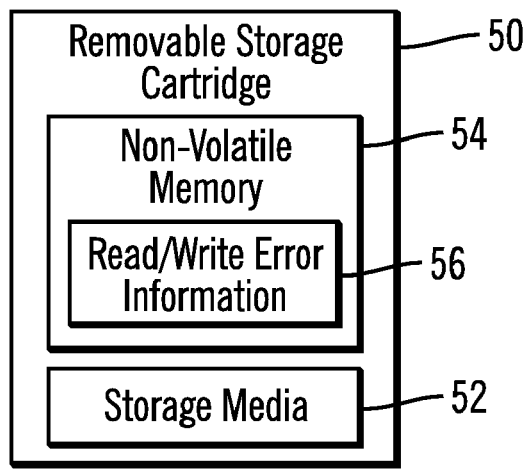
FIG. 2 illustrates an embodiment of a removable storage cartridge.

FIG. 2 illustrates an embodiment of one of a removable storage 14a, 14b, . . . 14n comprising a removable storage cartridge 50, such as a tape cartridge, having an internally contained storage media 52, such as magnetic or optical tape wound on a reel, a hard disk drive, etc. and a non-volatile memory 54 including read/write error information 56 concerning read/write operations performed with respect to the storage media 52. In one embodiment, non-volatile memory 54 may further include an antenna, which allows non-volatile memory 54 to function as a Radio Frequency Identification Device (RFID) transmitter and receiver which is capable of broadcasting the read/write error information 56 to a receiver in the customer computer 4 to provide to the removable storage manager 10 and which is also capable of receiving the read/write error information 56 from each of storage drives 12a, 12b . . . 12n where removable storage cartridge 50 resides during data I/O. This broadcasting of the read/write error information 56 to a receiver in the customer computer 4 may occur through an intermediary transmitter/receiver unit in the robotic picker/accessor in a library while the removable storage cartridge 50 is either in a storage slot, in the grasp of one of the grippers of the robotic picker/accessor, or while the removable storage cartridge 50 is residing in one of storage drives 12a, 12b . . . 12n in that library. The exemplary IBM LTO and IBM 3592 tape cartridges each have a non-volatile memory 54, which further comprises an antenna as described herein, which supports the storage, transmitting, and receiving of read/write error information 56

Figure 3:
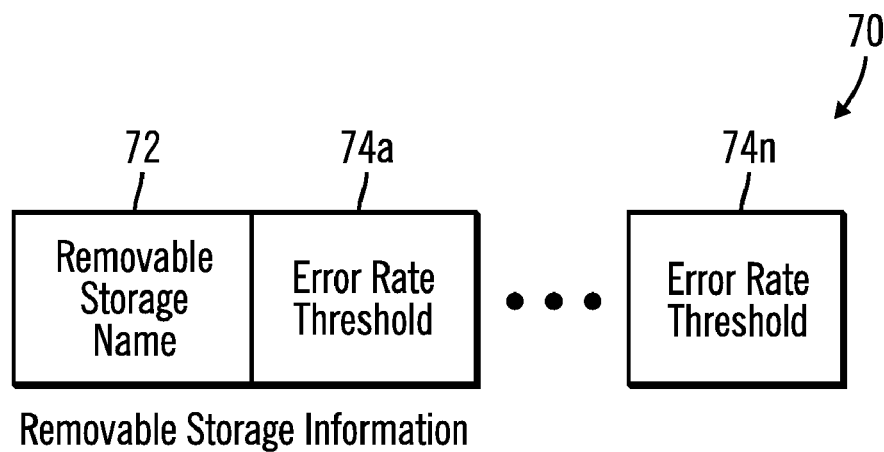
FIG. 3 illustrates an embodiment of removable storage information having error rate thresholds.

FIG. 3 illustrates an embodiment of removable storage information 70 maintained in the removable storage database 18 for each removable storage supported by the removable storage service provider 16. The removable storage information 70 includes a removable storage name 72 and one or more error rate thresholds 74a . . . 74n. Each error rate threshold 74a . . . 74n provides a threshold for a specific type of error rate, such that if the threshold is exceeded, the removable storage may be replaced and, if not exceeded, the removable storage may be maintained. For instance, the error rate for which thresholds are provided may include error rates that occur for correctable errors, such as C1 and C2 correctable read errors, stop-write error-rates, read-error rates, servo-pattern velocity error rates and lateral positioning error rates, and other error rates that may indicate that a removable storage is near the end of life.

The C1 and C2 errors are a correctable read error. For instance, when data is read back through the read channel of a storage drive for tape or other storage media, the storage drive 12a, 12b . . . 12n may check the correctness of the read bytes by verifying whether the data matches the C1 error correction code as the data is read from the removable storage 14a, 14b . . . 14n into the storage drive 12a, 12b . . . 12n. Once the data is stored in a buffer in the storage drive 12a, 12b . . . 12n, the storage drive 12a, 12b . . . 12n may verify whether the read data satisfies the C2 error correction code. The C1 error rate may comprise the total bytes read for the measurement period (e.g., such as the total bytes for the read data sets) divided by the number of C1 errors over the measurement period and the C2 error rate may comprise the total bytes read for the measurement period divided by the number of C2 errors over the measurement period.

The stop-write error rate may comprise the total bytes of data sets written for the measurement period divided by the total number of stop-write errors, which is an error that causes the storage drive 12a, 12b . . . 12n to stop-writing, which may be caused by defects on the removable storage 14a, 14b . . . 14n that result in problems with the written data, that is followed by repositioning and error recovery procedures. A stop-write error is alternately known as a hard-failure, as it is uncorrectable via error correction code and the data must be rewritten elsewhere on the storage media 52.

The servo pattern error rate may comprise the number of servo pattern errors for tape velocity as the tape moves along its length (longitudinal direction) or the I/O head transverses the tape and positions itself for I/O along the width direction of the tape. In certain embodiments, the threshold may comprise as low as one servo pattern error, as a servo pattern error could result in the loss of customer data. If read errors occur while reading the servo tracks, then writing data onto data tracks is immediately stopped. The storage drive 12a, 12b . . . 12n derives a position signal to determine the position of the read head relative to the data track from the servo patterns written to the removable storage 14a, 14b . . . 14n.

A rewrite rate may comprise the total rewrites of a data set divided by rewritten data sets. In a tape embodiment, the rewrite rate may comprise a codeword quad (CQ) rewrite rate, where data sets are written to tape in CQs having headers and synchronization marks.

Different error rate thresholds 74a . . . 74n values and different types of error rates may be provided for different removable storage types and for removable storages from different vendors. The error rate thresholds 74a . . . 74n may be based on empirical observation of the operations and failures of the removable storage 14a, 14b . . . 14n. Such error rate threshold information may be maintained confidentially and protected. The error rate threshold provided to the removable storage database 16 may be provided from the removable storage vendors or determined through empirical observation, where the error rate thresholds indicate an error rate at which the removable storage 14a, 14b . . . 14n should be replaced. Further, the service provider may update the removable storage error rates in the removable storage database 18 based on further observation as to the correlation of error rates and the removable storage end of life.

These error rates and accompanying thresholds have been described in terms of data per error, such as Terabytes per error. These error rates and accompanying thresholds may also be expressed as the reciprocal, namely errors per a fixed amount of data, such as errors per Terabyte. A Terabyte is effectively 1024 Gigabytes, a Gigabyte is effectively 1024 Megabytes, a Megabyte is effectively 1024 kilobytes, and a kilobyte is effectively 1024 bytes. Sometimes, the factor of 1024 is rounded off to simply a thousand.

Figure 4:
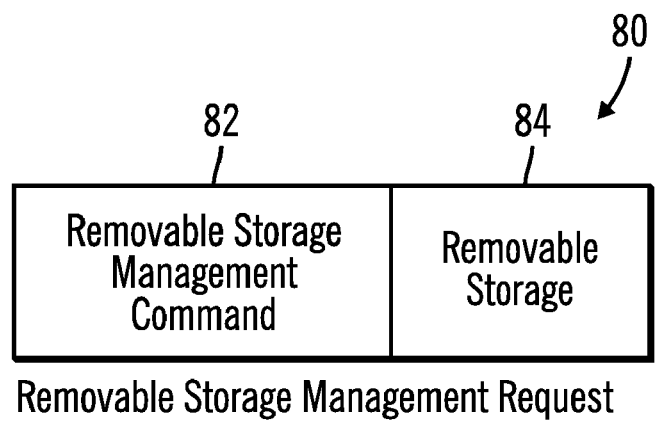
FIG. 4 illustrates an embodiment of a removable storage management request.

FIG. 4 illustrates an embodiment of a removable storage management request 80 the removable storage manager 10 may communicate to the removable storage service provider 16 requesting instructions providing a removable storage management command 82 on whether the listed removable storage 84 should be replaced. Listed removable storage 84 may comprise one or more removable storage cartridges 50 or removable storage 14a, 14b . . . 14n.

Figure 5:
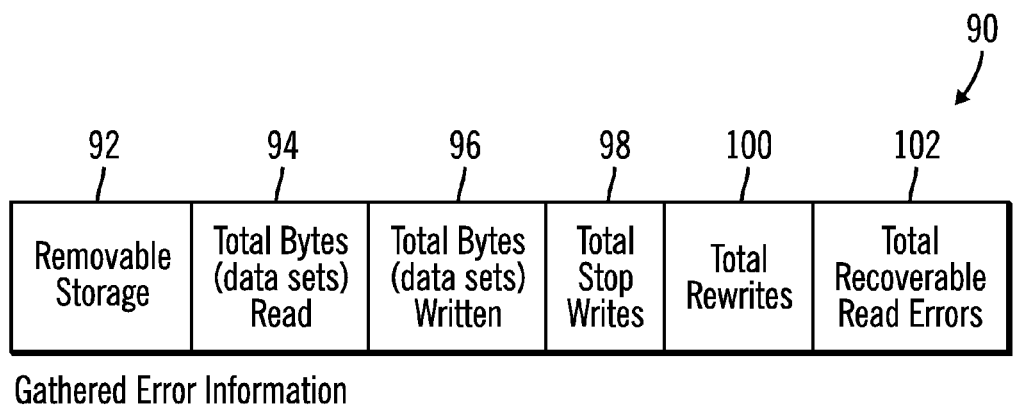
FIG. 5 illustrates an embodiment of gathered error information.

FIG. 5 illustrates an embodiment of gathered error information 90, for one removable storage 14a, 14b . . . 14n and/or removable storage cartridge 50, which the removable storage manager 10 transmits to the removable storage service provider 16 in response to a request for such information, including a removable storage 92 comprising one removable storage 14a, 14b . . . 14n and/or removable storage cartridge 50 for which the information was gathered during a measurement period; a total bytes read 94 or data sets; a total bytes written 96 or data sets; a total number 98 of stop-write errors; a total number of rewrites 100 of data sets; and the total recoverable read errors 102, such as C1 and C2 errors. In certain embodiments, gathered error information 90 may further comprise cartridge thread counts, cartridges loads, and cartridge age.

Figure 6:
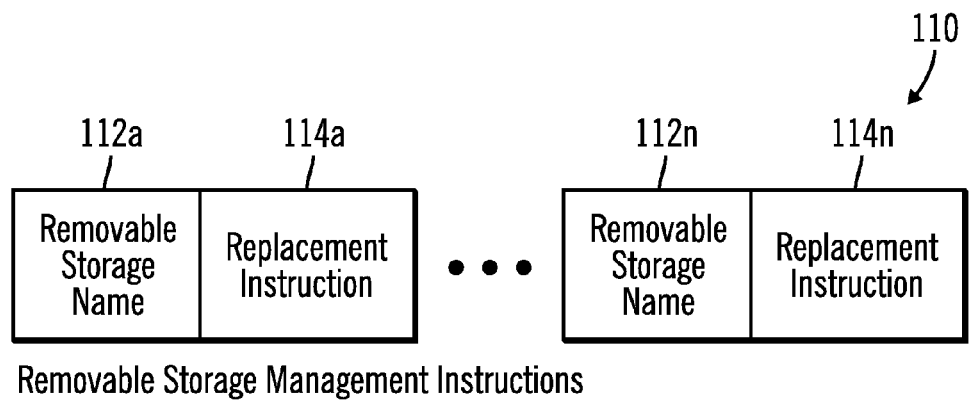
FIG. 6 illustrates an embodiment of removable storage management instructions.

FIG. 6 illustrates an embodiment of removable storage management instructions 110 which the removable storage service provider 16 transmits or otherwise communicates to the removable storage manager 10. The instructions 110 include replacement instructions for each requested removable storage 84 indicating whether to replace the removable storage 112a . . . 1112n and the corresponding replacement instruction 114a . . . 114n. This pairing of replacement instructions with the respective removable storage allows for the individual disposition of each removable storage. For example some removable storage may be disposed of in a long-term vault, while other removable storage may be physically shredded, while yet other removable storage may be bulk-erased under an extremely-strong alternating-magnetic-field.

Figure 7B:
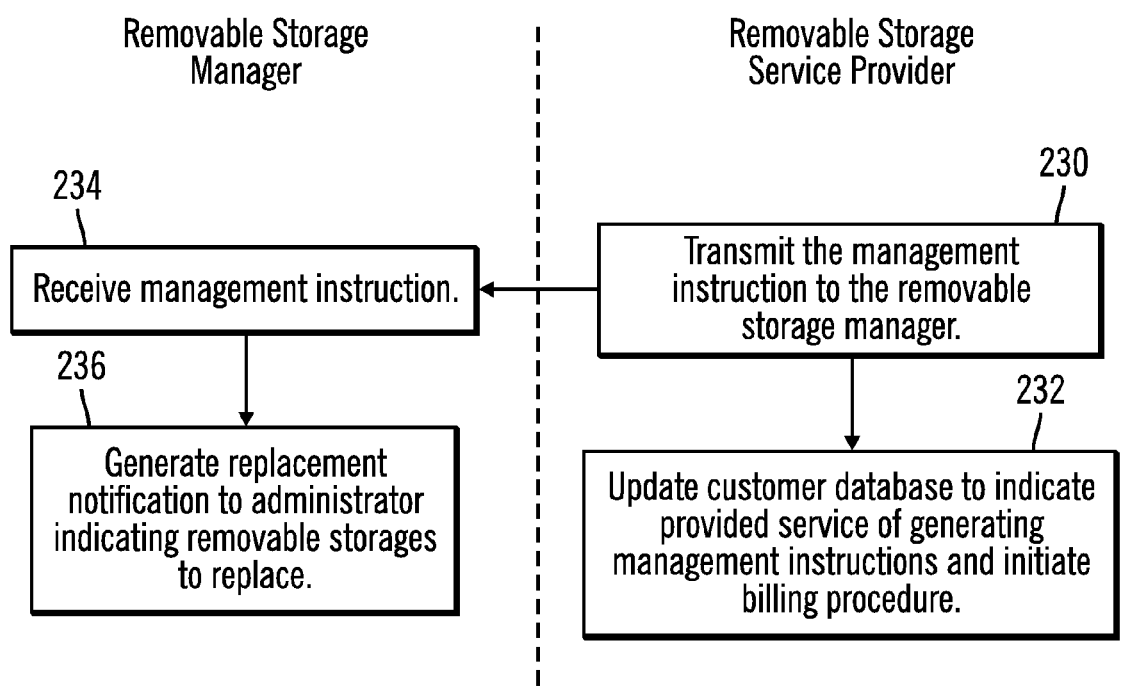

FIGS. 7a and 7b illustrate an embodiment of operations performed by the removable storage manager 10 and removable storage service provider 16 to perform replacement checking of removable storage 84, e.g., the removable storage 14a, 14b . . . 14n or the removable storage cartridge 50, at one of the customer sites 6. In one embodiment, the removable storage manager 10 initiates the process by sending (at block 200) the removable storage management request 80 to the removable storage provider 16 for management information for at least one removable storage 84 (FIG. 4). The removable storage manager 10 may periodically issue the requests according to a schedule. In an alternative embodiment, the removable storage service provider 16 may initiate the process according to a schedule accepted by the administrator at the customer site 6a, 6b . . . 6n. In response to receiving the request 80 (at block 202), the removable storage service provider 16 sends (at block 204) queries to the removable storage manger 10 to access read/write error information for the requested removable storages 84. In an alternative embodiment, the removable storage manager 10 may send the gathered read/write error information 90 with the initial removable storage management request 80.

In response to receiving (at block 206) the request for the read/write error information, the removable storage manager 10 communicates (at block 208) with the storage drives 12 to gather the read/write error information 90 for each removable storage 14a, 14b . . . 14n indicated in field 84 (FIG. 4) of the request 80. In one embodiment, the removable storage manager 10 may issue notifications to an administrator to load the requested removable storage 14a, 14b . . . 14n for which the read/write error information is to be gathered into the storage drive 12a, 12b . . . 12n to access. The error information may be stored on the storage media. In an alternative embodiment, the removable storage 14a, 14b . . . 14n may comprise a removable storage cartridge 50 with the read/write error information 56 maintained in the non-volatile memory 54 of the cartridge 50. In such case, the removable storage manager 10 may access the read/write error information 56 when the cartridge 50 is coupled to a storage drive 12a, 12b . . . 12n. In a further embodiment, if the removable storage manager 10 controls a picker assembly in a tape library, then the removable storage manager 10 may control the picker assembly to grasp the requested removable storage 14a, 14b . . . 14n for which information is requested and transfer the removable storage 14a, 14b . . . 14n to a storage drive 12a, 12b . . . 12n to access. In a still further embodiment where the storage cartridge 50 includes a wireless transmitter and receiver, such as an RFID transmitter and receiver, the removable storage manager 10 may read the read/write error information 56 from the cartridge 50 via the wireless communication technique used, such as RFID. In a yet further embodiment, the read/write error information may be maintained in a database maintained by the removable storage manager 10. In certain embodiments, the removable storage manager 10 controls a picker assembly in a tape library, then the removable storage manager 10 may control the picker assembly to grasp the requested removable storage 14a, 14b . . . 14n for which information is requested and transfer the removable storage 14a, 14b . . . 14n to a storage drive 12a, 12b . . . 12n to read/write test data to the requested removable storage 14a, 14b . . . 14n to obtain gathered error information 90.

The gathered read/write error information 90 for each requested removable storage 84 is then transmitted (at block 210) to the removable storage service provider 16 over the network 8. In one embodiment, the removable storage manager 10 may encrypt the gathered error information 90 using a publicly available encryption algorithm, as well as a private encryption key which may be a user-selectable key, a computer-application selectable key, or a key provided by the removable storage service provider 16. A user-selectable key may be different for each user and each time a key is selected, and this user-selectable key may be unavailable to the computer-application and the removable storage service provider 16. An application-selectable key is managed by the computer application itself and this application-selectable key may be unavailable and/or inaccessible to both the user and removable storage service provider 16. An encryption key may be provided by removable storage service provider 16, which also may be unavailable to the user and the computer-application.

Upon receiving (at block 212) the gathered error information 90 for each requested removable storage 84 (or for those which the error information 90 could be gathered), the removable storage service provider 16 selects (at block 214) one removable storage not yet considered, and considers each removable storage 84 for which gathered error information 90 was provided. At block 216, the removable storage service provider 16 determines from the removable storage database 18 the error rate thresholds 74a ... 74n for the requested removable storage, i.e., the entry 70 having a removable storage name 72 matching the requested removable storage. The removable storage service provider 16 processes (at block 218) the obtained read/write error information 90 for the requested removable storage to determine read/write error rates for the removable storage. For instance, the stop write rate may be calculated by dividing the total bytes written 96 by the number of stop writes 98, the rewrite rate may be calculated by dividing the total rewrites 100 by the total bytes written 96, the recoverable error rate may be calculated by dividing the total bytes read 94 by the total recoverable read errors 102, such as C1 and C2 errors. In an alternative embodiment the error rates may be calculated at the removable storage manager 10 and transmitted to the removable storage service provider 16.

The removable storage service provider 16 determines (at block 220) whether the calculated determined read/write error rates exceed the determined read/write error threshold. If (at block 222) all the determined error rates do not exceed their respective threshold error rates 74a ... 74n, then the removable storage service provider 16 includes (at block 224) a replacement instruction 114a ... 114n for the removable storage 112a ... 12n indicating to not replace. Otherwise, if (at block 222) one determined error rate exceeds the threshold for the error rate 74a ... 74n, then the removable storage service provider 16 includes (at block 226) a replacement instruction 114a ... 114n in the removable storage management instructions 110 indicating to replace the requested removable storage 112a ... 112n. In the embodiment at blocks 222, 224, and 226, the removable storage service provider 16 generates instructions to replace the removable storage if just one error threshold rate is exceeded. In an alternative embodiment, the replacement instruction may indicate to replace if less than all threshold error rates are exceeded. After generating the replacement instruction 114a ... 14n for the removable storage, if (at block 228) not all removable storage have been considered, then control proceeds back to block 214 for the next requested removable storage in field 84 (FIG. 4) to consider. If (at block 228) all removable storage has been considered, then control proceeds to block 230 in FIG. 7b.

With respect to FIG. 7b, after generating replacement instructions 114a ... 114n for all removable storages for which error information 90 was provided, the removable storage service provider 16 transmits (at block 230) the management instruction 110 to the removable storage manager 10. The removable storage service provider 16 may update (at block 232) the customer database 20 to indicate the service provided for the customer site 6a, 6b ... 6n of generating management instructions. The removable storage service provider 16 may further initiate a billing process to bill the customer site 6a, 6b ... 6n for the services of checking the requested removable storages 84 for errors and providing replacement instructions.

Upon receiving (at block 234) the management instructions 110, which may be transmitted in one or more messages, the removable storage manager 10 generates (at block 236) replacement notifications to a storage administrator indicating the removable storages 14 at the customer site 6a, 6b ... 6n to replace. To replace a removable storage 14, the removable storage manager 10 may migrate the data currently on the removable storage 14 indicated to replace to another removable storage 14 in a pool of available removable storages. The migration, replacement, and expiration policies may be performed by signaling an administrator to load a new removable storage 14, migrate the data, and discard the removable storage 14 to replace. In an embodiment where the removable storage manager 10 is part of a library management system, the removable storage manager 10 may control a picker assembly to remove and load removable storages 14, such as tape cartridges.

Described embodiments allow a customer to interface with a service provider to check error rates of customer selected removable storages to determine whether to replace the removable storages. In this way, the service provider may maintain error rate thresholds for removable storages from only one vendor or from different vendors to instruct the customer site to replace cartridges having sufficiently high error rates which indicate that failure of the removable storage is imminent.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where one or more processors may read and execute the code from one or more computer readable media. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, MRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variables such as "n", when used to represent a variable number of an element may indicate any number of instances of the element, and may indicate different integer numbers when used with different elements and at different instances of a same element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 7a and 7b show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising
interfacing, over a network, with removable storage managers executing in customer computers at different customer service sites to obtain read/write error information for removable storages coupled to the customer computers at the different customer service sites;
processing the obtained read/write error information for the removable storages at the different customer service sites to determine read/write error rates for the removable storages coupled to the customer computers;
determining whether the determined read/write error rates for the removable storages exceed at least one read/write error threshold; and
sending messages to the removable storage managers at the different customer service sites to replace the removable storages at the different customer service sites having read/write error rates that exceed the at least one read/write error threshold.

2. The method of claim 1, further comprising:
maintaining a database including removable storage read/write error thresholds for removable storages from different vendors, wherein the removable storage read/write error thresholds used in determining whether the determined read/write error rates exceed the removable storage read/write error thresholds are determined from the database;
receiving input to update the removable storage read/write error thresholds for at least one removable storage; and
updating the removable storage read/write error thresholds based on the received input.

3. The method of claim 1, further comprising:
maintaining a database including removable storage read/write error thresholds for removable storages from one vendor, wherein the read/write error thresholds used in determining whether the determined read/write error rates exceed the threshold are determined from the database.

4. The method of claim 1, further comprising:
receiving requests from the removable storage managers for removable storage replacement information;
wherein the operations of interfacing with the removable storage managers to obtain read/write error information for the removable storages are performed in response to the requests from the removable storage managers for removable storage replacement information and further comprises sending queries to the removable storage managers to access read/write error information from the removable storages for which the replacement information was requested.

5. The method of claim 1, wherein at least one of the removable storage managers manages a plurality of at least one storage drive and wherein the removable storages comprise a plurality of removable storages capable of being coupled to the at least one storage drive, and wherein the read/write error information is obtained for the removable storages managed by the removable storage manager.

6. The method of claim 5, wherein the read/write error information comprises at least one of total bytes read, total bytes written, total recoverable read errors, stop write rates, a total number of rewrites for total data set writes, and wherein the read/write error thresholds comprise a threshold for each rate obtained from the removable storage manager.

7. The method of claim 1, further comprising:
billing a customer periodically for replacing at least one of the removable storages having read/write error rates that exceed the at least one read/write error threshold.

8. A system in communication with customer computers, having removable storage managers, at different customer service sites over a network, wherein the customer computers are each coupled to at least one removable storage, comprising:
interfacing over the network with the removable storage managers executing in the customer computers at the different customer service sites to obtain read/write error information for removable storages at the customer service sites;
processing the obtained read/write error information for the removable storages at the different customer service sites to determine read/write error rates for the removable storages coupled to the customer computers;
determining whether the determined read/write error rates for the removable storages exceed at least one read/write error threshold; and
sending messages to the removable storage managers at the different customer service sites to replace the removable storages at the different customer service sites having read/write error rates that exceed the at least one read/write error threshold.

9. The system of claim 8, further comprising:
a database including removable storage read/write error thresholds for removable storages from different vendors, wherein the removable storage read/write error thresholds used in determining whether the determined read/write error rates exceed the removable storage read/write error thresholds are determined from the database;
wherein the operations further comprise:
receiving input to update the removable storage read/write error thresholds for at least one removable storage; and
updating the removable storage read/write error thresholds based on the received input.

10. The system of claim 8, further comprising:
a database including removable storage read/write error thresholds for removable storages from one vendor, wherein the read/write error thresholds used in determining whether the determined read/write error rates exceed the threshold are determined from the database.

11. The system of claim 8, wherein the operations further comprise:
receiving requests from the removable storage managers for removable storage replacement information;
wherein the operations of interfacing with the removable storage managers to obtain read/write error information for the removable storages are performed in response to the requests from the removable storage managers for removable storage replacement information and further comprises sending queries to the removable storage managers to access read/write error information from the removable storages for which replacement information was requested.

12. The system of claim 8, wherein at least one of the removable storage managers manages a plurality of at least one storage drive and wherein the removable storages comprise a plurality of removable storages capable of being coupled to the at least one storage drive, and wherein the read/write error information is obtained for the removable storages managed by the removable storage manager.

13. The system of claim 12, wherein the read/write error information comprises at least one of total bytes read, total bytes written, total recoverable read errors, stop write rates, a total number of rewrites for total data set writes, and wherein the read/write error thresholds comprise a threshold for each rate obtained from the removable storage manager.

14. The system of claim 8, wherein the operations further comprise:
billing a customer periodically for replacing at least one of the removable storages having read/write error rates that exceed the at least one read/write error threshold.

15. An article of manufacture implementing code to communicate with customer computers, having removable storage managers, at different customer service sites over a network, wherein each of the customer computers is coupled to at least one removable storage, and wherein the code is further executed to perform operations, the operations comprising:
interfacing over the network with the removable storage managers executing in the customer computers at the different customer service sites to obtain read/write error information for removable storages at the customer service sites;
processing the obtained read/write error information for the removable storages at the different customer service sites to determine read/write error rates for the removable storages coupled to the customer computers;
determining whether the determined read/write error rates for the removable storages exceed at least one read/write error threshold; and
sending messages to the removable storage managers at the different customer service sites to replace the removable storages at the different customer service sites having read/write error rates that exceed the at least one read/write error threshold.

16. The article of manufacture of claim 15, wherein the operations further comprise:
maintaining a database including removable storage read/write error thresholds for removable storages from different vendors, wherein the removable storage read/write error thresholds used in determining whether the determined read/write error rates exceed the removable storage read/write error thresholds are determined from the database;
receiving input to update the removable storage read/write error thresholds for at least one removable storage; and
updating the removable storage read/write error thresholds based on the received input.

17. The article of manufacture of claim 15, wherein the operations further comprise:
maintaining a database including removable storage read/write error thresholds for removable storages from one vendor, wherein the read/write error thresholds used in determining whether the determined read/write error rates exceed the threshold are determined from the database.

18. The article of manufacture of claim 15, wherein the operations further comprise:
receiving requests from the removable storage managers for removable storage replacement information;
wherein the operations of interfacing with the removable storage managers to obtain read/write error information for the removable storages are performed in response to the requests from the removable storage managers for removable storage replacement information and further comprises sending queries to the removable storage managers to access read/write error information from the removable storages for which replacement information was requested.

19. The article of manufacture of claim 15, wherein at least one of the removable storage managers manages a plurality of at least one storage drive and wherein the removable storages comprise a plurality of removable storages capable of being coupled to the at least one storage drive, and wherein the read/write error information is obtained for the removable storages managed by the removable storage manager.

20. The article of manufacture of claim 19, wherein the read/write error information comprises at least one of total bytes read, total bytes written, total recoverable read errors, stop write rates, a total number of rewrites for total data set writes, and wherein the read/write error thresholds comprise a threshold for each rate obtained from the removable storage manager.

21. The article of manufacture of claim 15, wherein the operations further comprise:
   billing a customer periodically for replacing at least one removable storages having read/write error rates that exceed the at least one read/write error threshold.

* * * * *